(12) United States Patent
Kim et al.

(10) Patent No.: US 8,427,106 B2
(45) Date of Patent: Apr. 23, 2013

(54) DYNAMICALLY RECONFIGURABLE FRAMEWORK FOR A LARGE-SCALE BATTERY SYSTEM

(75) Inventors: Hahnsang Kim, Ann Arbor, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 13/592,967

(22) Filed: Aug. 23, 2012

(65) Prior Publication Data

US 2012/0319493 A1  Dec. 20, 2012

Related U.S. Application Data

(63) Continuation of application No. 12/757,293, filed on Apr. 9, 2010, now Pat. No. 8,330,419.

(51) Int. Cl.
*H02J 7/00* (2006.01)

(52) U.S. Cl.
USPC ............ 320/121; 320/117; 320/120; 320/122

(58) Field of Classification Search .......... 320/116–122, 320/126
See application file for complete search history.

(56) References Cited

U.S. PATENT DOCUMENTS

| | | | |
|---|---|---|---|
| 4,175,249 A | 11/1979 | Gruber | |
| 4,894,764 A | 1/1990 | Meyer et al. | |
| 5,898,291 A * | 4/1999 | Hall | 320/121 |
| 6,873,133 B1 * | 3/2005 | Kavounas | 320/103 |
| 7,075,194 B2 | 7/2006 | Weidenheimer et al. | |
| 7,535,199 B2 | 5/2009 | Kimura et al. | |
| 7,557,538 B2 | 7/2009 | Yau et al. | |
| 2004/0101744 A1 | 5/2004 | Suzuki | |
| 2005/0052154 A1 | 3/2005 | Kavounas | |
| 2005/0242776 A1 | 11/2005 | Emori et al. | |
| 2006/0092583 A1 * | 5/2006 | Alahmad et al. | 361/15 |
| 2006/0164038 A1 | 7/2006 | Demers et al. | |
| 2009/0085553 A1 | 4/2009 | Kumar et al. | |
| 2010/0261043 A1 | 10/2010 | Kim et al. | |

OTHER PUBLICATIONS

S. Ci et al "A Novel Design of Adaptive Reconfigurable Multicell Battery for Power-Aware Embedded Networked Sensing Systems" IEEE Globecom 2007.

* cited by examiner

*Primary Examiner* — Richard V Muralidar
(74) *Attorney, Agent, or Firm* — Harness, Dickey & Pierce, P.L.C.

(57) ABSTRACT

A dynamically reconfigurable battery framework for management of a large-scale battery system systems is provided. The framework monitors, reconfigures, and controls large-scale battery systems online. The framework is built upon a topology-based bypassing mechanism that provides a set of rules for changing the battery-pack configuration, and a semantic bypassing mechanism by which the battery-cell connectivity is reconfigured to recover from a battery-cell failure. More specifically, the semantic bypassing mechanism implements a constant-voltage-keeping policy and a dynamic-voltage-allowing policy. The former policy is effective in preventing unavoidable voltage drops during the battery lifetime, while the latter policy is effective in supplying different amounts of power to meet a wide-range of application requirements.

18 Claims, 6 Drawing Sheets

DYNAMICALLY RECONFIGURABLE FRAMEWORK FOR A LARGE-SCALE BATTERY SYSTEM

CROSS-REFERENCE TO RELATED APPLICATIONS

This application is a continuation application of U.S patent application Ser. No. 12/757,293, filed Apr. 9, 2010 which claims the benefit of U.S. Provisional Application No. 61/168,472 filed on Apr. 10, 2009. The entire disclosure of the above application is incorporated herein by reference.

FIELD

The present disclosure relates to battery management and, more particularly, to a dynamically reconfigurable framework for a large-scale battery system.

BACKGROUND

Demand for electric vehicles with hybrid drive has soared worldwide due mainly to a recent sharp increase in fuel prices. As oil reserves continue to dwindle and oil prices rise, and with no viable alternative fuel technologies becoming apparent, the demand for electric vehicles with hybrid drive will only increase. According to a recent survey, in 2008 alone, 36.0% motorists worldwide want to buy a car with hybrid drive while 45.8% are interested in buying full-electric cars. Electric cars are powered entirely with electrical energy from tens of thousands of battery cells. These battery cells are grouped and assembled as a set of battery packs. Individual cells in a pack, which are exposed to, and must operate in a harsh environment, have different operating characteristics due to difference in their manufacturing tolerances, uneven temperature conditions across the pack, or non-uniform ageing patterns. These varied settings, in turn, have crucial effects on the charge/discharge of battery cells. In a series chain of battery cells, a weak battery cell with low capacity reaches its full charge state well before the rest of the battery cells in the chain, hence overcharging and overheating itself. On the other hand, when the weak cell cannot reach its full charge owing to a high self-discharge and/or a short-circuited cell, good battery cells may overcharge. In a series chain of battery cells, an open-circuited cell causes the others in the chain to become open-circuited as well. All of these phenomena eventually lead to a battery-cell failure, which is inevitable especially in large-scale battery packs.

The most commonly-used method for managing a large-scale battery system is module-based, where battery cells are grouped into smaller modules of battery cells, each of which is monitored, controlled, and balanced by the corresponding local controller while a group of modules are managed by a global controller. In such a modular battery-management system, individual electronic control units (ECUs) collect information-such as cell voltage and current, temperature, etc. on their serially-connected battery packs via an equalizer connected to each battery cell, and then process and report the collected information to the central ECU responsible for making the local ECUs work as required.

Individual battery cells can be charged and discharged separately via the switches around them. Separate discharge or bypassing specific cells, however, requires fine-grained management of battery cell arrangement and battery dynamics while considering their attributes (e.g., cell voltage balancing and capacity efficiency).

Battery-cell failures are inevitable, especially for large-scale batteries, and the failure rate for a multi-cell battery pack is much higher than that of each cell because of inter-cell interactions and dependencies. Unlike the battery packs used for portable electronic devices, the electronic vehicle environment imposes many challenging requirements on battery cells and their management.

There are two main challenges in developing a dynamic reconfiguration framework for large-scale battery-management systems. First, the framework should be able to reconfigure battery connectivity online, upon detection of a battery-cell failure. Healthy battery cells should also be kept in use, possibly in the form of two hierarchical layers of connectivity: battery cells in each pack (cell-level) and packs in the entire battery system (pack-level). Second, unlike battery-powered portable devices, a large-scale battery-management system, especially for electric vehicles, requires multiple output terminals of the power source (from the battery packs), supplying different voltages for different applications and/or devices. Physical separation of battery packs is, however, rarely an option mainly for cost reasons.

This section provides background information related to the present disclosure which is not necessarily prior art.

SUMMARY

A reconfigurable battery system is provided with a plurality of battery circuits adjoined to each other. The battery circuits include: an input terminal; an output terminal; a battery cell with a positive terminal and a negative terminal interposed between the input terminal and the output terminal; and a plurality of switches interconnecting the battery cell with a battery cell in an adjacent circuit. The plurality of switch may be configured to place the battery cell in series with the battery cell in the adjacent battery cell, place the battery cell in parallel with the battery cell in the adjacent battery circuit, or disconnect the battery cell from the battery cell in the adjacent circuit. A control unit receives an output criteria and controls the switches in each of the battery circuits to form a circuit arrangement that meets the output criteria while substantially maximizing power delivered by the circuit arrangement, where the output criteria defines a number of outputs for the circuit arrangement and a voltage requirement for each output.

The plurality of switches include an input switch connected between the input terminal and the negative terminal of the battery cell; a parallel switch connected between the output terminal and the positive terminal of the battery cell; a bypass switch connected between the negative terminal of the battery cell and a negative terminal of an adjacent battery circuit; and a series switch connected between the positive terminal of the battery cell and the negative terminal of the adjacent battery circuit. The plurality of switches may further include an input-terminal switch interposed between the input terminal and an input terminal of the adjacent battery circuit as well as an output-terminal switch interposed between the output terminal and an output terminal of the adjacent battery circuit.

Further areas of applicability will become apparent from the description provided herein. The description and specific examples in this summary are intended for purposes of illustration only and are not intended to limit the scope of the present disclosure.

DRAWINGS

Figure 1:
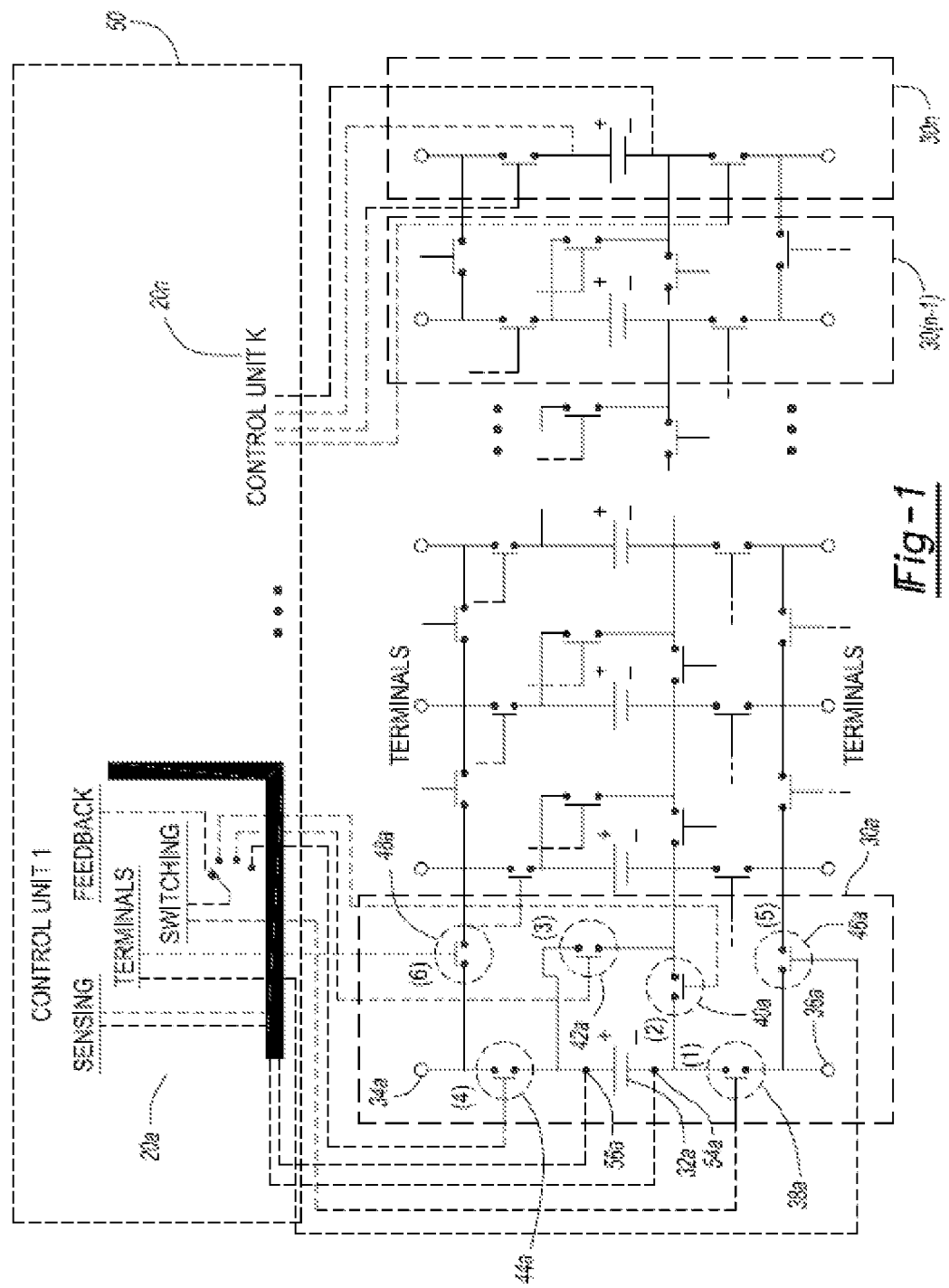
FIG. 1 is a diagram depicting an exemplary arrangement for a reconfigurable battery system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

A rechargeable battery cell may be any cell capable of converting chemical energy to electrical energy, and vice-versa. This is typically accomplished by electrochemical oxidation and reduction reactions. These reactions involve the exchange of electrons through the load between electro-active species in two electrodes inside the battery cell, generating a flow of electric current. Ideally, the total number of current units, or Coulomb, from a battery cell will always be the same throughout its entire life cycle. In reality, however, the characteristics of a battery cell are nowhere close to being ideal due to the uncertainty of reaction kinetics and diffusion processes and/or active material dissolution in the battery cell over time. Exemplary battery cells may include nickel metal hydride (NiMH), lithium ion, nickel cadmium (NiCd), lithium iron phosphate, lithium sulfur, lithium-titanate, nickel hydrogen, nickel-metal hydride, nickel-iron, sodium sulfur, vanadium redox, and rechargeable alkaline. The architecture described below may be applied to these as well as other types of rechargeable battery cells.

Rechargeable battery cells exhibit different characteristics in practice. For instance, the battery terminal voltage is not constant during its discharge; voltage drops non-linearly with a discharge rate. The higher the discharge rate, the steeper the voltage drop. For this reason, a DC-DC converter may be used to shift and stabilize the supply voltage. Second, battery capacity varies with the discharge rate; the higher the discharge rate, the lower the battery capacity. Third, batteries have limited charge recovery effects at a high discharge rate. A high load current for a short period of time causes a higher concentration gradient among electro-active species, making the unused charge unavailable due to the lag between reaction and diffusion rates. Thus, when the battery is allowed to rest for some time at a low (or zero) charge rate, the voltage that dropped temporarily goes back up. Last, temperature also affects internal resistance and full charge capacity. The lower the temperature, the higher the internal resistance, thereby reducing full charge capacity. On the other hand, high temperature leads to self-discharge, reducing the actual capacity to be delivered. In addition to these characteristics, some batteries, e.g., NiCd batteries, are known to have memory effect, while Lithium-ion batteries do not.

Apart from temporary changes in battery capacity noted above, batteries may lose their capacity to some extent due to unwanted side reactions including electrolyte decomposition, active material dissolution, and passive film formation, thereby increasing internal resistance and ultimately causing a battery-cell failure. Several possible failure modes exist, making the battery cell behavior difficult to predict. First, an open circuit can be a fail-safe mode for other battery cells in the series chain including an open-circuited battery cell, because the open circuit limits further damage to the other battery cells. However, this failure mode may not be useful to the applications because all the battery cells in the series chain can become open-circuited and unusable. Second, a short circuit that has an abnormal low electrical resistance incurs almost no voltage drop, so that the rest of the battery cells in the chain could be slightly overloaded while the whole battery pack (i.e., a set of the battery cells) remains functional. Last, a possible explosion is avoided via a protection circuit that detects and stops an extremely high current.

FIG. 1 depicts an exemplary arrangement for a reconfigurable battery system 10. The reconfigurable battery system 10 is comprised generally of a plurality of battery circuits 30a-30n arranged adjacent to or adjoined to each other. Each battery circuit 30-30n has an associated control module 20a-20n. In an exemplary embodiment, the control modules 20a-20n are implemented by a controller 50 although it is envisioned that the functions supported by the control modules 20a-20n (or portions thereof) may be partitioned amongst multiple controllers. As used herein, the term module may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. It is should be understood that software or firmware programs are implemented as computer executable instructions residing in a computer memory and executed by a computer processor.

The battery circuits 30a-30n are comprised of an input terminal 36a, an output terminal 34a, and a battery cell 32a interposed between the input terminal 36a and the output terminal 34a. The design of the dynamic reconfiguration framework is guided by a principle: one should be able to bypass any battery cell. In addition, as few switches as possible should be placed around a given battery cell to minimize cost and improve reliability. In the exemplary embodiment, each battery circuit further include four switches: an input switch 38a (also referred to as $S_I$) connected between the input terminal 36a and the negative terminal of the battery cell 32a; a parallel switch 44a (also referred to as $S_P$) connected between the output terminal 34a and the positive terminal of the battery cell; a bypass switch 40a (also referred to as $S_B$) connected between the negative terminal of the battery cell and a negative terminal of an adjacent battery circuit; and a series switch 42a (also referred to as $S_S$) connected between the positive terminal of the battery cell 32a and the negative terminal of the adjacent battery circuit. Battery circuits 30a-30n are interconnected by input terminal switches 46a-46n and output terminal switches 48a-48n (also referred to as $S_{IT}$ and $S_{OT}$, respectively) which to allow the battery system to provide multiple terminals as further described below. While reference is made to a particular switch arrangement, other switch arrangements are within the broader aspects of this disclosure.

Control units 20a-20n configure the switches in the plurality of battery circuits to form different circuit arrangements. For example, battery cells may be configured in a series arrangement by setting the switches in a given battery circuit 30b as follows: input switch 38b is set off; series switch 42b is set on; bypass switch 40b is set off; and parallel switch 44b is set off, where on is a closed circuit across the switch and off is an open circuit across the switch. When a plurality of cells are arranged in series, a cell 32b can be bypassed by setting the switches as follows: input switch 38b is set off; series switch 42b is set off; bypass switch 40b is set on; and parallel switch 44b is set off. It is readily understood that switches in battery circuits on either end of the series string may be configured differently to place the respectively cell in the series string or be bypassed.

To configure battery cells in parallel with each other, switches in a given battery circuit 30b are configured as follows: input switch 38b is set on; series switch 42b is set off; bypass switch 40b is set off; and parallel switch 44b is set on. Likewise, it is understood that switches in battery circuits on either end of the parallel grouping may be configured differently to place the respectively cell in parallel with the remaining cells. When a plurality of cells are arranged in parallel, a cell can be bypassed by setting all of the switches in the given battery circuit to off.

The architecture of the dynamic reconfigurable battery system 10 can be represented as $\Psi=(E,F,S,D)$, where E is an array of sensors, $\{E_1, \ldots, E_i, \ldots, E_k\}$ each of which reads the voltage and the current of a corresponding battery cell. F denotes an array of feedback switches, $\{F_1, \ldots, F_i, \ldots, F_k\}$, that the controller maintains to determine which cell to be bypassed. When a battery-cell failure in device i is detected, $(F_i, On)$ is turned. S denotes an array of the switches, $\{S_1, \ldots, S_i, \ldots, S_k\}$, where $S_i$ is composed of $S_{i,I}$, $S_{i,O}$, $S_{i,B}$, $S_{i,S}$, $S_{i,P}$, $S_{i,IT}$, and $S_{i,OT}$. D is a set of battery devices, $\{D_1, \ldots, D_i, \ldots, D_k\}$. The connectivity of these devices is thought of as an $n_s \times n_p$ matrix:

$$\begin{pmatrix} D_{1,1} & \cdots & D_{1,n_p} \\ \vdots & \ddots & \vdots \\ D_{n,n1} & \cdots & D_{n,n_p} \end{pmatrix} \quad (1)$$

where $n_s$ is the number of battery cells connected in a series chain and $n_p$ is the number of the series chains connected in parallel. The terms $V_d$ and $V_a$ denote the voltage demand and the average voltage of battery cells (or a set of battery packs), respectively. It is understood that the voltage demand is dictated by the application. Similarly, $f_N$ is defined as:

$$f_N = \sum_{i=1}^{k} \iota(F_i)' \quad (2)$$

where $(F_i)$ is an indication function, i.e., if $(F_i, Off)$ holds, then the function returns 1, else it returns 0.

During operation, the control unit for a given battery circuit monitors an operational state of the battery cell in the battery circuit and controls switches in the battery circuit in accordance with the operational state. In the exemplary embodiment, control unit 20a-20n communicates with two sensors 54a-54n and 56a-56n to monitor the battery condition. For example, control unit 20a-20n monitors changes in the state of charge (SOC) and voltage of its battery cells via sensing devices 54a-54n and 56a-56n. The SOC of a battery cell may be estimated by measuring and integrating the current flowing into and out of battery cell 32a-32n over time, called a Coulomb count. In practice, voltage and temperature may also be figured in as battery variables. Thus, function $f_{V,T}(SOC, \int Idt)$, that is based on the content of the coulomb count returns SOC. On the other hand, in general, direct voltage measurement is not accurate enough to be used as an indicator because of its dependency on the discharge rate and temperature. Voltage may be estimated by applying a Kalman filter in some embodiments. Alternatively, one may assume that an integrated recursive function, $f_{V,I,T}(SOC, \int Idt)$, is given and returns [V, SOC]. Other techniques for determining state of charge and/or voltage of battery cells are also within the scope of this disclosure. It is readily understood that different types of sensors may be used to monitor battery conditions.

At periodic monitoring intervals ($\Delta t$,), the controller 50 checks the SOC of each battery cell via the corresponding control unit 20a-20n and triggers a rotation event if $$\frac{\min(SOC_1, \ldots, SOC_k)}{\max(SOC_1, \ldots, SOC_k)} < \delta \quad (3)$$

holds, where $\delta$ denotes a threshold that bounds the maximum variation of SOCs. The larger the $\delta$, the more the battery cells become unbalanced. Furthermore, the variation needs to be adjusted with $\delta$, in conjunction with $\Delta t$, because the larger the $\Delta t$, the larger the variation. In particular, $\Delta t$ is inversely proportional to the discharge rate. A rotation event is an adjustment in the battery pack where health battery cells are rotated with other healthy battery cells for the purpose of keeping the cells healthy.

For discussion purposes, a faulty cell may be regarded as a battery cell that can be charged as low as 80% nominal capacity and/or that has voltage as low as the cut-off voltage in a fully charged state. Thus, when battery cell i is determined faulty ($F_i$, On) is turned in control unit i. Other criteria for determining a faulty cell are also contemplated.

At each monitoring interval ($\Delta t$,), the controller 50 also checks the average voltage and triggers a reconfiguration event unless $$V_d \leq V_a * n_s \langle V_d + \alpha \quad (4)$$

holds, where $\alpha$ specifies an upper bounds of voltage unbalancing. It can be observed that $\alpha$ is tuned based on the granularity in supply voltage. The reconfiguration event causes the controller to change the topology of the battery circuits. A reconfiguration event typically occurs when a battery cell is determined to be faulty. A reconfiguration event may also occur when additional applications require a voltage supply, thereby requiring a multiple terminal configuration. Other types of triggering reconfiguration events are also contemplated by this disclosure.

In the event of a battery cell failure or another triggering reconfiguration event, a semantic bypassing mechanism configures battery connectivity. In general, the semantic bypassing mechanism implements policies for supplying a wide range of voltages while abiding by voltage balancing across the parallel groups of the series chains. In an exemplary embodiment, two policies are implemented by the semantic bypassing mechanism although other policies are contemplated by this disclosure. The semantic bypass mechanism is implemented by the controller.

First, a constant-voltage-keeping policy is specified to keep the supply voltage as constant over the battery lifetime as possible in spite of the battery-cell failure. To this end, the series chain containing the faulty battery cell is bypassed. However, it is possible that the voltages of both used and unused healthy battery cells in the series chain may drift apart over time, resulting in unbalanced voltages between the battery cells within the series chain. For this reason, a rotation event is triggered during the monitoring, reconfiguring the battery-cell connectivity. For connectivity reconfiguration, battery cells at the lowest level of their SOC are singled out first.

Figure 2:
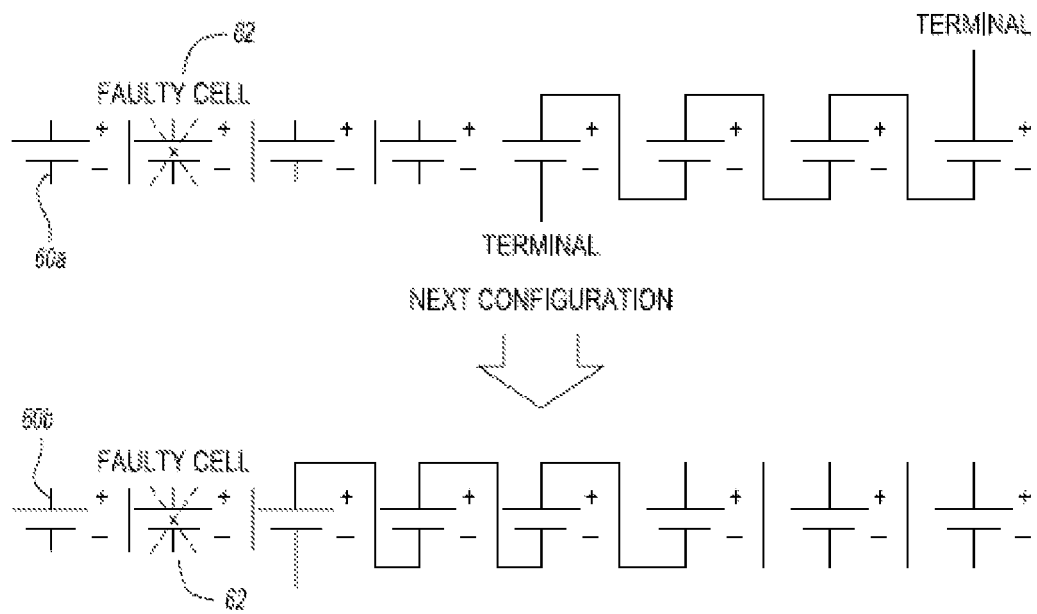
FIG. 2 is a diagram illustrating reconfiguration of battery cells under a constant-voltage policy.

FIG. 2 illustrates the reconfiguration of battery cells in a series chain under the constant-voltage-keeping policy. In FIG. 2, two configurations 60a and 60b are depicted. In a first configuration 60a, the last four battery cells are connected in series. In a second configuration 60b, controller 52 has connected the middle four battery cells in series in accordance with the constant voltage keeping policy. As can be seen, the healthy battery cells are being rotated, thereby keeping the voltage constant. As can be observed in the figure, the faulty cell 62 is excluded in both configurations.

To implement a constant-voltage keeping policy, controller 52 must determine how many battery cells should be bypassed. The number of battery cells to be bypassed is calculated as follows. Given $V_d$, $n_s$ is first calculated by $$\left\lceil \frac{V_d}{V_a} \right\rceil;$$

use of $V_a$ offsets the nonlinear voltage drop during their lifetime. $n_p$ is then derived from $$\left\lfloor \frac{f_N(\Psi)}{n_s} \right\rfloor,$$

where $f_N(\Psi)$ indicates/returns the total number of battery cells available to use. This equation leads to $(f_N(\Psi)-n_s \cdot n_p)$ healthy battery cells to be bypassed. This procedure repeats at periodic intervals ($\Delta t$) or upon initiation of a reconfiguration event.

Figure 3:
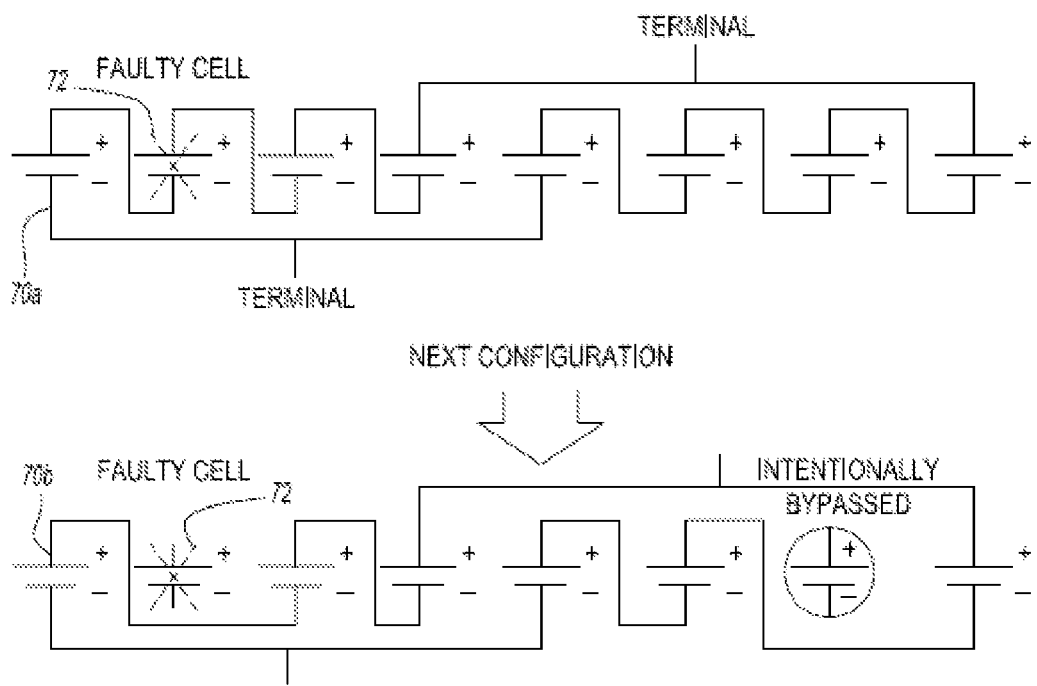
FIG. 3 is a diagram illustrating reconfiguration of battery cells under a dynamic-voltage allowing policy.

Alternatively, a dynamic-voltage-allowing policy is defined to support as many applications as required and to improve the maximum deliverable power, given available battery cells, at the expense of a voltage drop that corresponds to a single battery-cell voltage. Under the dynamic-voltage-allowing policy, one or more healthy battery cells in a series chain may be singled out as shown in FIG. 3. To apply this policy, $n_p$ remains fixed in accordance with the application requirements and $n_s$ is then calculated by $$\left\lfloor \frac{f_N(\Psi)}{n_p} \right\rfloor,$$

resulting in $(f_N(\Psi)-n_s \cdot n_p)$ healthy battery cells to be bypassed. As with the constant-voltage-keeping policy, the battery cells are singled out based on their SOC. Likewise, this procedure repeats at periodic monitoring intervals ($\Delta t$) or upon initiation of a reconfiguration event.

These two policies may be further understood from the example, set forth below. Suppose three parallel groups, each of which has 4 battery cells in series, the configuration is represented as C1(O), C2(O), C3(O), C4(O)
C5(O), C6(O), C7(O), C8(O)
C9(O), C10(O), C11(O), C12(O)

where O indicates which of corresponding cells are being used. Suppose that the voltage of each cell equals 1V so that each series string outputs 4V. Assuming that C6 and C8 fail, two cells in the other groups should rest in order to balance voltages across the groups, resulting in this configuration:

C1(O), C2(O), C3(-), C4(-)
C5(O), C6(X), C7(O), C8(X)
C9(O), C10(O), C11(-), C12(-)

where X indicates the corresponding cells fail and - indicates the cells rest.

The semantic bypassing mechanism will reconfigure battery connectivity in accordance with one of the two policies. If the constant-voltage keeping policy is applied (i.e., demand voltage is 4V), then the resulting configuration is C1(O), C2(O), C3(O), C4(O)
C5(O), C6(X), C7(O), C8(X), C9(O), C10(O)
C11(-), C12(-)

and the power output by this configuration is 4V*2 (=8P). On the other hand, if the dynamic-voltage allowing policy is applied, then the resulting configuration is C1(O), C2(O), C3(O),
C4(O), C5(O), C6(X), C7(O),
C8(X), C9(O), C10(O), C11(O), C12(-)

with the power output by this configuration being 3V*3 (=9P). In the dynamic-voltage allowing policy, the number of parallel groups ($n_p$) is not changed. Instead, by adjusting output voltage with ns, the deliverable power may be increased.

These two policies are complementary to maximize the battery usability. In particular, according to the load demand which is application-specific, the constant-voltage keeping policy is applied whenever it is necessary. For example, a system that supports dynamic-voltage scaling reduces down its system voltage when it has a low demand. To do this, the system often uses a step-down DC-DC converter. A DC-DC converter may consume energy in the course of conversion. In this case, instead of using the DC-DC converter, applying the constant-voltage keeping policy to the reconfigurable system allows more energy-savings. On the other hand, the dynamic voltage keeping policy is applied when multiple applications are to be accommodated simultaneously. Applications that require different voltage and power need a specific capacity, thereby defining in the number of parallel groups, $n_p$, needed and causing them to be fixed.

Once $n_s$ and $n_p$ are determined in accordance with the applied policy, the controller 50 applies a connectivity configuration algorithm to achieve the desired circuit arrangement. An exemplary configuration algorithm is set forth below.

```
Config (F, ns, np):
  f ← find(F ≠1, F=TB+PB);   /* Find cells available to use */
  k ← f[1];                   /* Select the first available cell */
  for i ← 1 : np
    Signal (S_{k,I}, On);    /* Start a parallel-connected group */
    while Fk = 1              /* Check whether the k-th bit in F is 1 */
      Signal (S_{k,B}, On);   /* Bypass cellk */
      k ← k +1;
    end while
    Signal (S_{k,S}, On);     /* Connect cells in series */
    j ← 1;
    while j < (ns − 1)
      k ← k +1;
      while Fk = 1
```

-continued

```
        Signal (S_{k,B}, On);      /* Bypass cellk */
        k ← k +1;
    end while
    Signal (S_{k,S}, On);          /* Connect cells in series */
    j ← j +1;
    end while
    Signal (S_{k,P}, On);          /* End a parallel-connected group */
end for
```

The connectivity configuration algorithm begins by determining which cells in the system are available for use. When the k-th local control unit reports a cell failure to the controller, the controller updates its data structure, PB, to permanently bypass the faulty cell by setting PB(k) to 1, where PB is a bit-vector of size equal to the total number of battery cells and k is the k-th bit of the bit-vector. The occurrence of a cell failure requires a healthy cell in each parallel group to become inactive, i.e., temporarily bypassing it. This intentional bypass is tracked by the controller which maintains another data structure, TB, for temporary bypass, where TB is a bit-vector of size equal to that of PB.

Starting with the first available cell, a parallel-connected group is constructed by the algorithm. Each cell is evaluated sequentially. Healthy cells are connected in series; whereas, unhealthy or failed cells or healthy cells reflected by TB are bypassed. The procedure repeats until $n_s$ healthy cells are connected in series, thereby forming a parallel-connected group. The process moves to the next parallel-connected group and repeats the procedure until $n_p$ parallel-connected groups have been formed. It is envisioned that other procedures may be used to connect cells to achieve the desired circuit arrangement.

Unlike ideal cells, the output voltage of cells is not constant during their discharge. That is, $n_s \times V_a$ drops nonlinearly, deviating from Vd. The deviation can be handled by using a DC-DC converter. A DC-DC converter, however, dissipates energy in the form of generation of heat. The energy dissipation is gauged with conversion efficiency for the DC-DC converter ($EFF_{DC-DC}$) given by $EFF_{DC-DC} = (I_{OUT} \times V_{OUT})/(I_{IN} \times V_{IN})$, where $I_{IN}$ and $V_{IN}$ each are input current and voltage to the DC-DC converter, and $I_{OUT}$ and $V_{OUT}$ are output current and voltage from it, respectively. $EFF_{DC-DC}$ can be approximated to be between 75% and 95%, when the input variation is not extreme; DC-DC converters are most efficient when the input voltage is closest to the output voltage. It is important to find the right point in time for reconfiguration so as to minimize power dissipation. Define a function of power: $f_{DC-DC}: V_{IN} \times V_{OUT} \to EFF_{DC-DC}$. Then, power dissipation is given by $PD=(1-f_{DC-DC}(V_{IN}, V_{OUT})) \times V_{IN} \times I_{IN}$. Once $V_{IN}$ is determined, the constant-voltage keeping policy is applied To minimize power dissipation, adjust $V_{IN}$ to $V_d$ by reconfiguring the cell connectivity. Assuming the reconfiguration overhead is limited by the switching overhead, the switching overhead includes the power consumption of transmitting a signal to a switch and turning on/off the switch. This overhead in discrete-time seldom varies and is thus approximated to be constant, resulting in a negligible amount of power dissipation, compared to the energy dissipation in continuous time. The controller self-configures the cell arrangement whenever a priori power dissipation is greater than a posteriori power dissipation (after the reconfiguration) including the switching overhead, i.e., when satisfying the condition:

$$(1-f_{DC-DC}(Vc,Vd)) \times Pc\Delta tC > (1-f_{DC-DC}(V^*d,Vd)) \times P^*d \times \Delta t_C - \alpha \times P^*d$$

where Vc denotes a priori terminal voltage, and V*d is an approximation of the demand voltage, Vd; and α is a switching overhead. With V*d, the controller recalculates $n_s$ and $n_p$. This criterion allows the controller to self-reconfigure the cell connectivity in real time.

The architecture described above may be extended to multiple battery packs, where each battery pack is comprised of a reconfigurable battery system 10 as described above. In other words, each battery pack is comprised of a plurality of battery circuits and a local controller that controls the operation of the battery circuits. This extended architecture further includes a global controller in data communication with each of the local controllers to coordinate functions amongst the battery packs. Extension of the dynamic reconfiguration framework to multiple battery packs is represented as $\gamma=(E, F, S, \Psi)$, where $\Psi=\{\Psi_1, \ldots, \Psi_2, \ldots, \Psi_k\}$. $\gamma$ is configured by the global controller in cooperation with the local controllers; whereas, each $\Psi_i$ is configured via its respective local controller. The two policies described above can be implemented in and applied by the global controller.

Global controller reconfigures the battery cells in $\gamma$ in conjunction with local controllers, generating a wide range of supply voltages for the load. Given $V_d$, the global controller calculates the number of battery cells to be connected in series $\Psi_k$ and $\gamma$, i.e., $$n_s \cdot N_s \equiv \left\lceil \frac{V_d}{V_a} \right\rceil, \quad (5)$$

where $n_s \leq f_N(\Psi_k)$ is the number of battery cells in a series chain in $\Psi_k$ and $N_s \leq f_N(\gamma)$ is the number of battery cells in a series chain in $\gamma$. This equation holds on the condition that if $f_N(\Psi_k) \leq f_N(\gamma)$, then $n_s \leq N_s$, or if $f_N(\gamma) \leq f_N(\Psi_k)$, then $N_s \leq n_s$. After $n_s$ and $N_s$ are resolved subject to the condition, $n_p$ in $\Psi_k$ is calculated by $$\left\lfloor \frac{f_N(\Psi_k)}{n_s} \right\rfloor.$$

Likewise, $N_p$ (the number of series chains connected in parallel) in $\gamma$ is calculated by $$\left\lfloor \frac{f_N(\gamma)}{N_s} \right\rfloor.$$

As a consequence, the local controllers and the global controller apply the connectivity configuration algorithm with arguments of $(\Psi, n_s, n_p)$ and $(\Psi, N_s, N_p)$, respectively, thereby resulting in all the battery cells in and out of the battery packs configured in tandem.

When a plurality of battery packs are arranged in parallel, it may be necessary to bypass one of the battery packs if the battery pack includes failed battery cells. Similar to the local controller, the global controller determines as failure when $(F_i, On)$ is detected. However, when $\Psi_i$ is simply bypassed, some battery cells in $\Psi_i$ may become unusable. To address this issue, the global controller performs a pack-level bypassing decision algorithm. In this algorithm, the global controller finds the minimum number of available cells across packs, denoted as $n_m$, and then calculates how many cells will be bypassed in each pack, based on previous values of $n_m$. This decision is systematically made by the global controller via a decision function set forth below:

```
Y = {f_N(ψ_1),...,f_N(ψ_k)}; B=0;
Battery-Pack Bypassing Decision (Y, B):
    n_m ← min (Y);           /* the smallest number of cells across packs */
    n_pb ← |{ ψ_i | n_m=f_N(ψ_k)}|      /* the number of packs that have n_m */
    n_b ← Σ (Y- n_m );       /* sum of cells that may be bypassed */
    if n_b ≧ (n_m × n_pb + B)
        Battery-Pack Bypassing Decision
        (Y – { ψ_i | for all k, n_m=f_N(ψ_k)}, n_m× n_pb);
    else
        return n_m;
    end if
```

Two examples are provided below to better understand this decision function. In a first example, suppose that there are 4 battery packs each of which initially has 6 cells. That is, [6, 6, 6, 6]. When 1, 2, and 2 cells have failed in packs 1, 2, and 3, respectively, (denoted by [5, 4, 4, 6]), we get $n_m=4$. Since the number of cells to be bypassed in each pack (denoted as $n_b$), i.e., the sum of (1, 0, 0, and 2) is smaller than $n_m \times 2$, the algorithm does not bypass packs 2 and 3. Instead, it decides to bypass 2 cells in pack 1 and 1 cell in pack 4. In an second example, assume [4, 2, 3, 6]. In this example, $n_m=2$. Since $n_b=7$ (i.e., 2+0+1+4) is greater than $n_m$, pack 2 is bypassed, resulting in [4, 3, 6]. In this step, $n_m=3$. Since $n_b=4$ (i.e., 1+3) is smaller than $n_m+n_m^*$(the previous $n_m$), the algorithm returns $n_m$ (i.e., the latest $n_m$). Each pack then bypasses its cells based on $n_m$. That is, 1, 2, 0, and 3 cells are bypassed in packs 1, 2, 3, and 4, respectively. In this way, the global controller can determine when and how to bypass a battery pack. When the local controller in each pack receives the latest value of $n_m$ from the global controller, each local controller applies the constant-voltage keeping policy based on $n_m$.

The reconfigurable framework described above can also be used to support multiple applications, where an application requires power from the battery system. For example, in a vehicle, the starter motor, the windshield wipers and the radio may all require power from the battery system. Each application defines an output voltage requirement $V_d$ and may be assigned a priority. The output voltage requirement $V_d$ for an application k determines the number of cells in series $N_{s,k}$ needed to meet the requirement. The sum of $N_{p,1}$, $N_{p,2}$, ..., $N_{p,k}$, gives the total number of healthy battery cells. $N(\gamma)$ leads to q parallel groups for all the applications.

Battery cells can then be allocated to each of the requesting applications. If the number of battery cells needed to meet the application requirements exceeds the number of battery cells available for use, then the available battery cells are assigned to applications based on the priority assigned to the applications. If the number of battery cells available for use exceeds the number of cells needed to meet the application requirements, then the controller can allocate remaining cells. In either case, available battery cells are distributed first to high-priority applications, i.e., those with a high demand voltage. This distribution continues until the remaining cells are not enough to be distributed. An exemplary allocation policy is defined as follows.

Multi-Terminal-Based Grouping:

```
/* {N_s,1, ... ,N_s,i, ... N_s,k | N_s,1 > ... > N_s,i, > ... > ... N_s,k}*/
N_p,1, ... ,N_p,i, ... N_p,k ← –1
```

```
q ← ⌊ N(γ) / (N_s,1 + ... N_s,i + ... N_s,k) ⌋;
for j ← 0;
    if ( fN(γ) – q Σ_{i=1}^{k} N_s,i ) < Σ_{l=1}^{J} N_p,i · N_s,i
        N_p,j ← 0;
    end if
end for
[N_p,1, ... ,N_p,i, ... N_p,k] ← [N_p,1, ... ,N_p,i, ... N_p,k]+q;
return [N_p,1, ... ,N_p,i, ... N_p,k]
```

Thus, the controller allocates the power source of $N_{s,k} \times N_{p,k}$ to each application k. In the case of the extended reconfigurable framework, the allocation policy is implemented by the global controller.

Once the battery cells have been allocated, the controller(s) configure the battery system accordingly. The battery system is first configured to provide an input terminal and an output terminal for each application having allocated battery cells. To do so, input-terminal switches 46a-46n and output-terminal switches 48a-48n are controlled to provide multiple terminals. For instance, when input-terminal switches ($S_{i,I}$, On) and output-terminal switches ($S_{i,P}$, On) stay for all battery circuits 30a-30n, the interface for the battery pack has a single input terminal and a single output terminal. Conversely, to segment the battery circuits 30a-30n and provide multiple terminals, select input-terminal switches and output-terminal switches can be set to Off. For each application segment, the battery system is then configured to meet the application requirements using the semantic-bypassing mechanism described above.

Large-scale battery cells, e.g., for EVs and HEVs, are packed in such a way that $n_s$ battery cells are connected in series, providing the required supply voltage, and $n_p$ parallel groups are connected in parallel, determining flows of the current (I), resulting in the required capacity. The capacity, because of the nonlinearities of batteries, cannot be derived simply by the ideal battery capacity equation:

$$C = T \cdot 1, \quad (6)$$

where T is the discharge time (the battery lifetime). Instead, empirical Peukert's relation models nonlinearities for the case of a constant current load by introducing an empirical parameter as: $C = T \cdot 1^\alpha$, where $\alpha > 1$ is called Peukert's value, which typically ranges between 1.2 and 1.4.

For purposes of the reconfigurable battery management system, the nonlinearity may be modeled using discretization of a flow of the current. That is, real-world systems are characterized by loads that are variable over time. Such variable loads may be approximated by piece-wise constant loads, represented by a set of M current levels ($i_1, \ldots, i_M$), in which M is used to characterize the load and is determined by the quantization interval, $\Delta t (\equiv t_i - t_{i+1})$ which is a fraction of the total operation time, T. That is $$I_i(t) \equiv \sum_{i=1}^{M} i_i \cdot 1_{[t_{i-1}, t_i]}(t),$$

where $1_A(t)$ is an indicator function. So, the smaller the $\Delta t$, the higher the accuracy in the characterization of the load. In the case where $\Delta t \equiv T$, the load is constant. The patterns of the load can be obtained via empirical measurements, resulting in a discharge profile for a battery cell or a pack of battery cells. Thus, the model of Eq. (6) generalizes to $$C = T \cdot I_i(t). \tag{7}$$

The total load is the sum of the current that is loaded from individual parallel groups, i.e., $I=I_1+\ldots+I_i+\ldots+I_{np}$ and it is uniformly distributed at some point in time within a certain acceptable threshold in discrepancy, leading to $I=n_p \cdot 1_i$. This results in $$C = T \cdot \frac{I(t)}{n_p}. \tag{8}$$

When cell failures occur, the number of available parallel groups equals $n_p - N(t)$, where $N(t)$ is the total number of failures occurred in the battery-cell array by time t. In the ABS, the number of available parallel groups is defined as:

$$n_A \equiv n_p - \left\lceil \frac{N(t)}{n_s} \right\rceil, \; 0 \le N(t) \le n_p \cdot n_s \tag{9}$$

Since the numbers of these failures that occur in disjoint time intervals are independent, N(t) is Poisson distributed with a battery-cell failure rate, λ. So, the average total number of cell failures that occur by time t is proportional to t, resulting in λ·t. This equation is applied to Eq. (9) yielding:

$$C = T \cdot \frac{I(t)}{n_A} \equiv T \cdot \frac{I(t)}{n_p - \left\lceil \frac{\lambda \cdot t}{n_s} \right\rceil}, \tag{10}$$

where $$t < \frac{n_p \cdot n_s}{\lambda} \le T.$$

On the other hand, in a legacy scheme, the load for a series chain of operational battery cells increases in proportion to the total number of cell failures across the $n_p$ parallel groups as:

$$n_L = \begin{cases} n_p - N(t), & 0 < N(t), < n_p \\ 0, & n_p < N(t) \le n_p \cdot n_s \end{cases} \tag{11}$$

The linear increase in the load is due to the fact that it fails to reuse any healthy battery cells in the series chain containing a faulty cell. So, the available capacity in following the legacy scheme is calculated by $$C \equiv T \cdot \frac{I(t)}{n_L} \equiv T \cdot \frac{I(t)}{n_p - \lambda \cdot t}, \tag{12}$$

where $$t < \frac{n_p}{\lambda} \le T.$$

Therefore, the higher λ, the more lifetime gain over the legacy scheme; it is also inversely proportional to the number of battery cells in series, $n_s$.

Either of the two policies described above is applied, based on the configuration of the battery-cell connectivity. To maximize battery-cell utilization the capacity of power that the entire battery cells deliver is selected as a criterion to compare the two policies. If an m×n matrix represents a combination of $n_s$ battery cells in a series chain and there are $n_p$ parallel groups, any element of battery cells in the matrix is assumed to become faulty independently of others. For instance, when one battery cell fails, $(n_s-1) \cdot n_p$ of power is provided, based on the dynamic-voltage allowing policy. For simplicity, it is assumed the element of each battery cell is capable of 1 volt and 1 ampere, while $n_s \cdot (n_p-1)$ of power based on the constant-voltage keeping policy. So, the breakeven point in selecting the policy is found when $n_s = n_p$. When more than one battery cell fails, the number of battery cells left unused due to the faulty-cell detouring reflects a measure of the capacity. In other words, a ratio (r) of the number of columns (c) to the number of rows (w) counted on faulty cells in the matrix can be a factor in the decision to make, comparing with the total size of the matrix. So, the breakeven point is determined by $$r \equiv \frac{c}{w} \equiv \frac{n_p}{n_s}, \tag{13}$$

and hence, when $$r > \frac{n_p}{n_s},$$

the dynamic-voltage allowing policy is chosen, providing more capacity of power than the constant-voltage keeping policy.

An evaluation methodology is first described and then the performance of the described architecture is evaluated in comparison with a legacy scheme that cannot configure the battery-cell connectivity online. The metrics used for evaluation of battery performance include the battery lifetime and the supply voltage. The lifetime is proportional to the total capacity of the battery cells/packs, while the supply voltage determines the deliverable power. The battery dynamics were simulated using Dualfoil, which is widely used for designing multiple battery systems. For a more detailed explanation of Dualfoil, reference is made to "Modeling of galvanostatic charge and discharge of the lithium/polymer/insertion cell" *J. of Power Sources,* 140(6)1526-1533, 2003. Using Dualfoil is sufficient to demonstrate the way the battery connectivity is dynamically reconfigured.

Figure 4:
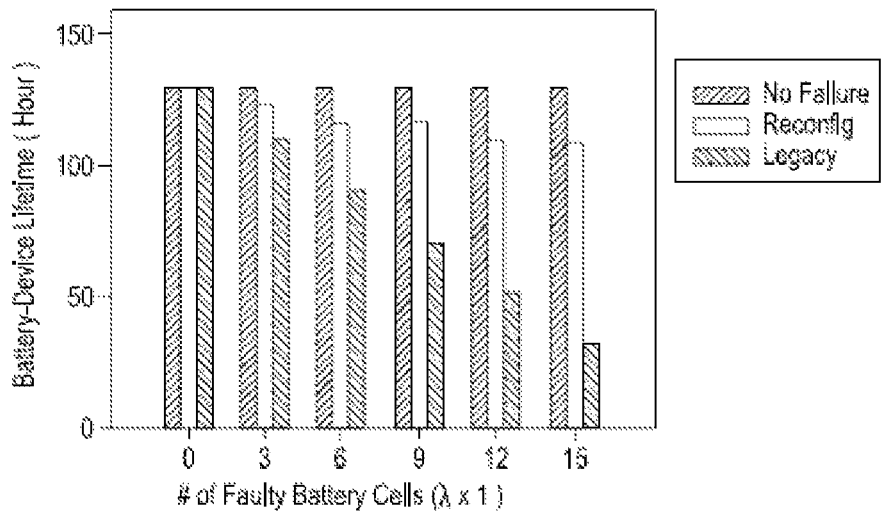
FIG. 4 is a graph illustrating the difference between a reconfiguration scheme and a legacy scheme as it relates to the lifetime of a battery.
Figure 5:
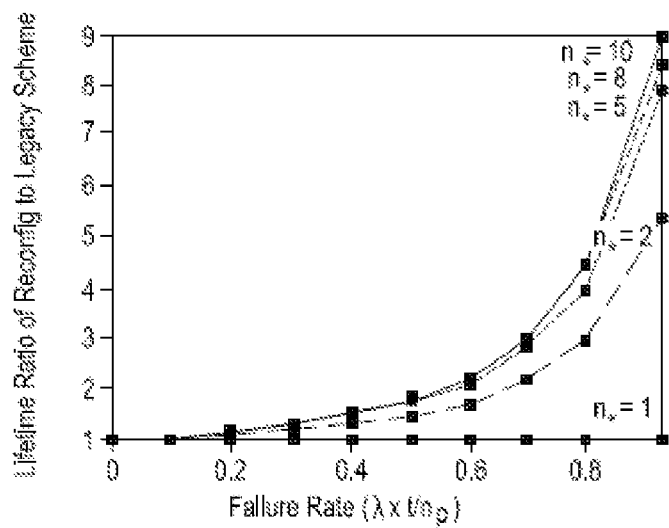
FIG. 5 is a graph illustrating battery lifetime gain achieved by reconfiguration as a function of the number of battery cells in a series chain.

The reconfiguration framework effectively "masks" the effects of a battery-cell failure, thus extending the battery lifetime, while the legacy scheme significantly suffers battery-capacity loss and hence reduces the lifetime. The battery lifetime is computed with the maximum deliverable power and the amount of current constantly drawn from the battery pack. Obviously, the more the battery-cell failures, the higher the reduction in the battery lifetime. FIG. 4 illustrates the results of the comparison of the battery lifetimes. Clearly, the legacy scheme loses a significant amount of span as the number of faulty battery cells increases. The reason for this is that the failure of one battery cell results in the loss of the series chain including the faulty battery cell. By contrast, the reconfiguration framework reuses the remaining healthy battery cells in the series chain as backup cells. So, despite additional battery-cell failure in other chains, they are replaced with surviving healthy battery cells. FIG. 4 shows the fault-tolerance capability of the proposed reconfiguration framework. For instance, when $\lambda \cdot t \equiv 6$ through 9 and $\lambda \cdot t \equiv 12$ through 15, the battery-pack's lifetime remains constant irrespective of an increase in number of battery-cell failures. The difference in lifetime between the two mechanisms gets larger as the frequency of battery-cell failures gets higher. As can be seen in FIG. 5, the lifetime gain achieved by the reconfiguration framework grows substantially with an increase in number of battery cells in a series chain ($n_S$) in each parallel group, thus enhancing the availability of backup battery cells. This is effective even for the case of connecting two battery cells in series (i.e., $n_s=2$), achieving a factor of 5 gain. Clearly, the more the battery cells in series, the larger the gain.

Figure 6:
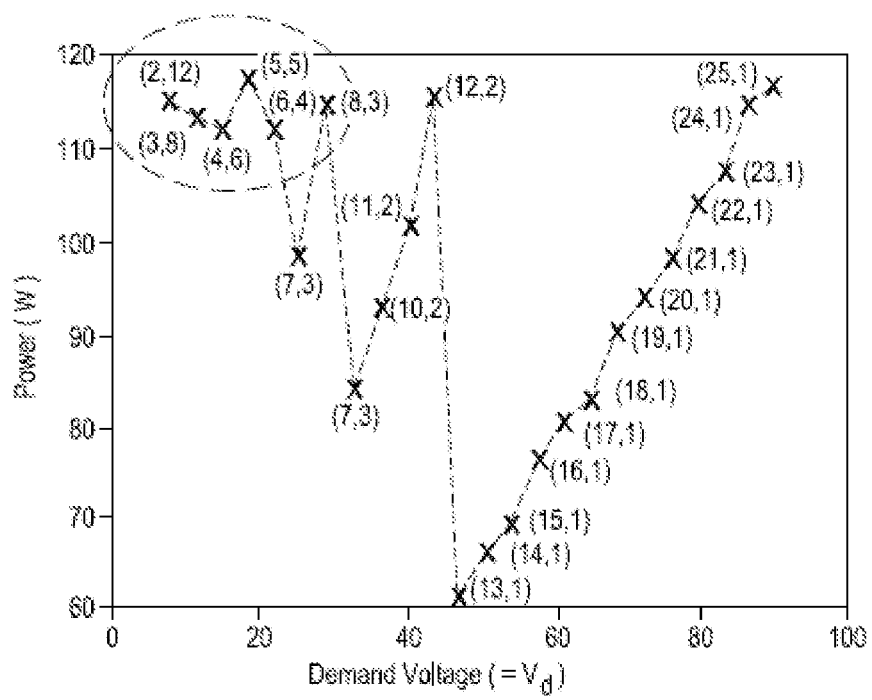
FIG. 6 is a graph illustrating changes in demand voltage and presentation of the corresponding power.

The dynamic-voltage-allowing policy aims to meet the demand of wide-ranging supply voltages from different applications while keeping deliverable power maximum. FIG. 6 illustrates changes in the demand voltage and the corresponding maximum deliverable power resulting from a 25-battery-cell pack that is based on the configuration of setting actual supply voltage and capacity of each battery cell to 3.6 Volts and 1.3 AH, respectively, with jitter of 2.5% allowed. So, maximum deliverable power is bounded by between an estimated 114 W and 120 W. This power can be delivered in a combination of 5 parallel groups and 5 battery cells of a series chain in each group (i.e., (5, 5)), or one parallel group with 25 battery cells in series (i.e., 25, 1)). Interestingly, a good range of supply voltages, corresponding to the group circled in FIG. 6, is provided while keeping maximum deliverable power reasonably constant. This implies that appropriately turning the battery connection can improve the utilization of battery cells while meeting the demand of the underlying applications. In the meantime, the connectivity of (9, 2) or (13, 1) appears inefficient with respect to the utilization of battery cells. However, failure of any battery cell or a voltage drop can be resolved by virtually replacing them with backup battery cells, thereby maintaining the required voltage level.

Figure 7:
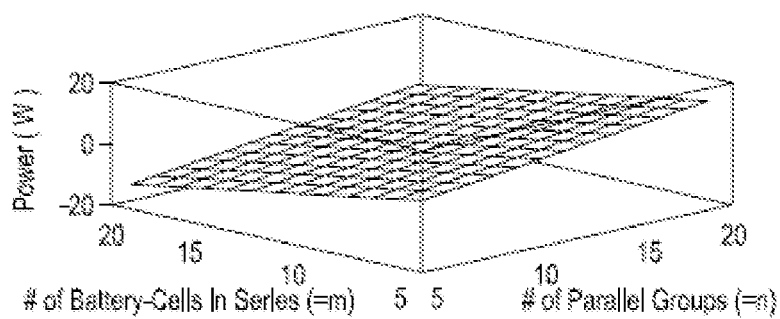
FIG. 7 is a graph showing a comparison of dynamic voltage allowing and constant voltage keeping policies with maximum deliverable power.

The dynamic-voltage-allowing and constant-voltage-keeping policies are devised for different purposes: the former aims to meet the demand of wide-ranging supply voltages, while the latter is to sustain an acceptable range of supply voltage against battery failures or a possible voltage drop during the battery lifetime, both with the deliverable power kept maximum. So the two policies can be compared with respect to the deliverable power. FIG. 7 shows the distribution of power magnitudes between the constant-voltage-keeping and the dynamic-voltage-allowing policies. In battery connectivity, when $n_s > n_p$, the dynamic-voltage-allowing policy is effective in supplying the maximum deliverable power, while when $n_p > n_s$, the constant-voltage-keeping policy is a better choice. The reason for this lies in the utilization of unused battery cells/packs. Obviously, the break-even point occurs when $n_s = n_p$.

Figure 8A:
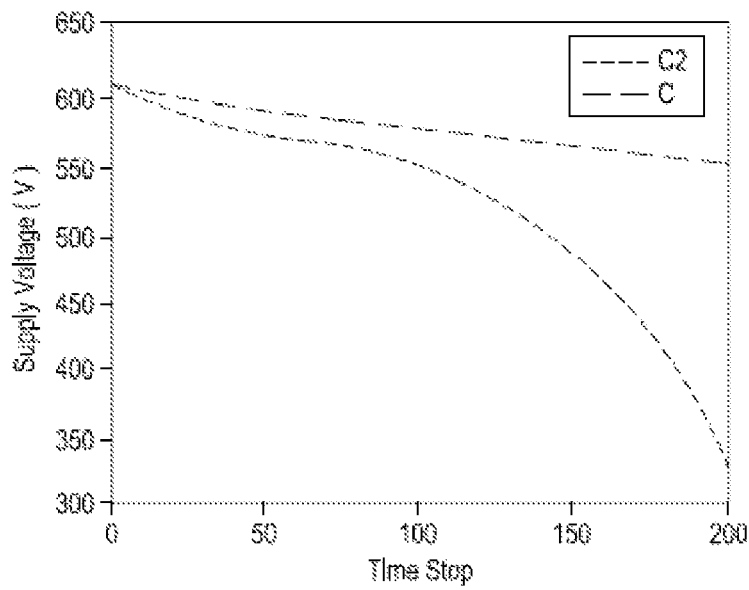
FIGS. 8A-8D are graphs depicting dynamic reconfiguration subject to a voltage demand with respect to different discharge rates.
Figure 8B:
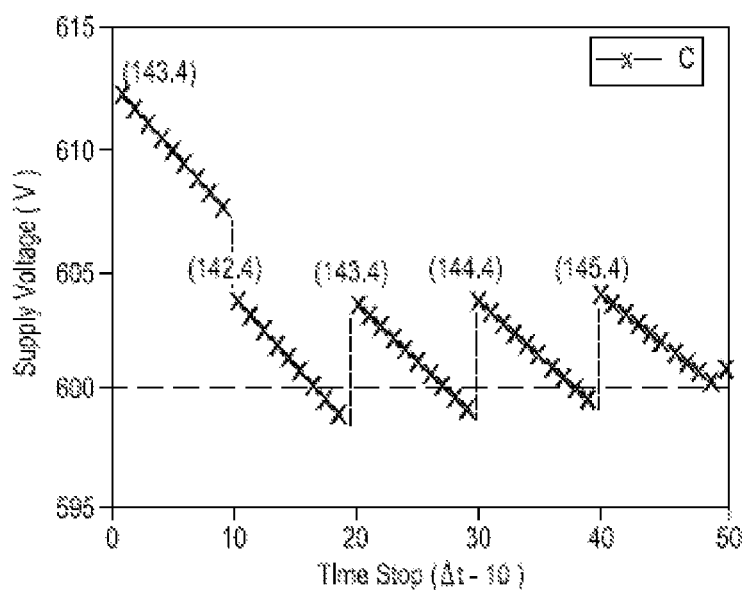
Figure 8C:
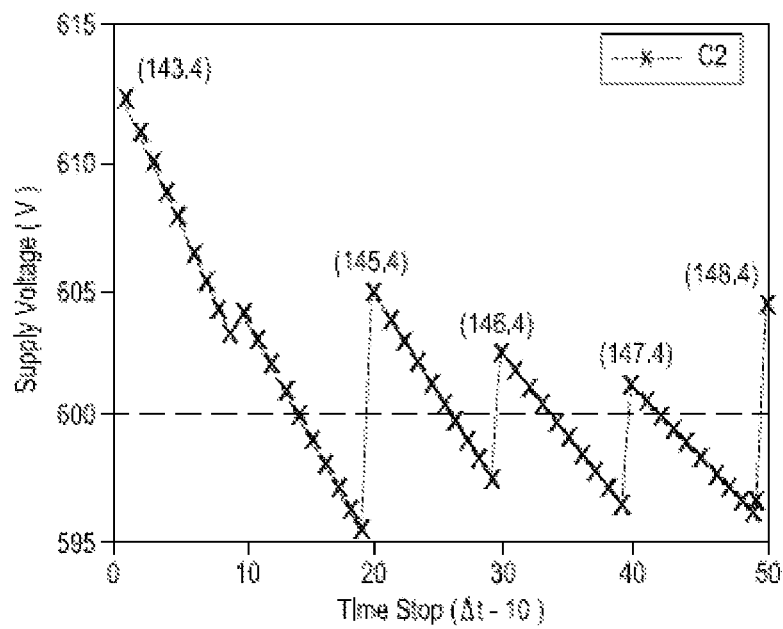
Figure 8D:
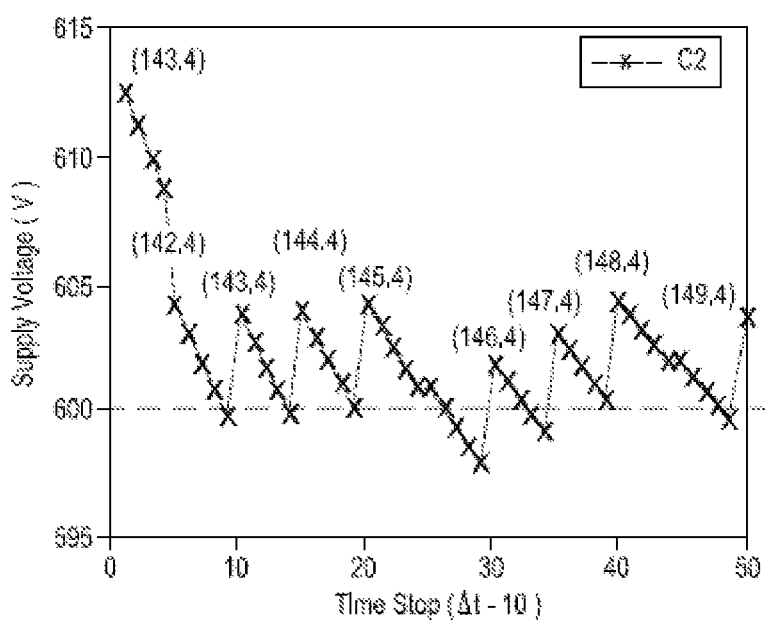

As mentioned earlier, since the voltage drop is unavoidable, the constant-voltage-keeping policy is applied to keep the supply voltage above or equal to the demand voltage while the supply voltage is being monitored. The monitoring interval ($\Delta t$) is directly associated with a degree to which the system may suffer due to the voltage drop below the demand. The higher the frequency of monitoring, the shorter the time an application suffers, but the higher the overhead of monitoring. FIG. 8A shows changes in supply voltage with two different discharge rates during the lifetime of a 700-battery-cell pack. It is assumed that each battery cell is discharged independently, following the distribution of discharging a Lithium-ion battery that is simulated with the configuration of providing output voltage of 4.3 volts and nominal capacity of 1.3 AH. Demand voltage ($V_d$) for an application is assumed to be 600 volts. In the case where the battery pack is discharged at C rate, in FIG. 8B, when the battery pack is monitored every $\Delta t$ (=10), it is detected at the $10^{-th}$ time interval when the supply voltage drops below $V_d$, reconfiguring the battery pack connectivity into 4 parallel groups with 143 battery cells in a series chain, i.e., (143, 4), providing an estimated 604 volts. In the case of C2 rate, in FIG. 8C, the underlying application suffers 5 times more battery-capacity loss than at the normal discharge rate. In particular, the more steeply does the supply voltage drop, the larger the difference between the supply and demand voltages. This case can be improved by reducing the monitoring interval ($\Delta t=10$). As can be seen in FIG. 8D, with the monitoring interval halved ($\Delta t=5$), on-time detection of the voltage drop is improved by 67%.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A reconfigurable battery system comprising:
a plurality of battery circuits interconnected to each other, each circuit having:
   a negative input terminal;
   a positive output terminal;
   a battery cell with a positive terminal and a negative terminal interposed between the input terminal and the output terminal;
   an input switch connected between the input terminal and the negative terminal of the battery cell;
   a parallel switch connected between the output terminal and the positive terminal of the battery cell;
   a bypass switch connected between the negative terminal of the battery cell and a negative terminal of an adjacent battery circuit; and
   a series switch connected between the positive terminal of the battery cell and the negative terminal of the adjacent battery circuit; and
a control unit that receives an output criteria and, in accordance with the output criteria, controls the input switch, the parallel switch, the bypass switch and the series switch in the plurality of battery circuits to output a voltage to at least two positive output terminals while substantially maximizing power delivered by the circuit arrangement, where the output criteria defines a number of positive output terminals at which to output a voltage and a voltage requirement for each output.

2. The reconfigurable battery system of claim 1 wherein the control unit determines a number of battery cells available for use from the battery cells in the plurality of the battery circuits and allocates the battery cells available for use to each output defined by the output criteria.

3. The reconfigurable battery system of claim 2 wherein the control unit receives a number of parallel cell groupings and configures the input switch, the parallel switch, the bypass switch and the series switch in the plurality of battery circuits to form a circuit arrangement that minimizes the number of battery cells available for use that are bypassed in the circuit arrangement.

4. The reconfigurable battery system of claim 2 wherein the control unit determines a number of cells to comprise each parallel cell grouping by dividing the number of battery cells available for use by the number of parallel cell groupings, where the cells comprising a parallel cell grouping are arranged in series with each other.

5. The reconfigurable battery system of claim 1 wherein the control unit configures the input switch, the parallel switch, the bypass switch and the series switch in the plurality of battery circuits by determining a number of battery cells arranged in series are needed to meet the voltage output requirement and determining a number of battery cell groups which can be arranged in parallel to each other from the number of battery cells available for use, where each battery cell group is comprised of a string of battery cells arranged in series that meet the voltage output requirement.

6. The reconfigurable battery system of claim 5 wherein the control unit configures the input switch, the parallel switch, the bypass switch and the series switch in the plurality of battery circuits to form a circuit arrangement which outputs a voltage that meets the voltage output requirement when the number of battery cell groups exceeds the number of battery cells arranged in series that meet the voltage output requirement.

7. A reconfigurable battery system comprising:
a plurality of battery circuits adjoined to each other, each battery circuit having:
   a negative input terminal;
   a positive output terminal;
   a battery cell with a positive terminal and a negative terminal interposed between the intput terminal and the output terminal;
   a plurality of switches interconnecting the battery cell with a battery cell in an adjacent circuit and configurable to place the battery cell in series with the battery cell in the adjacent battery cell, or place the battery cell in parallel with the battery cell in the adjacent battery circuit, or disconnect the battery cell from the battery cell in the adjacent circuit; and
a control unit that receives an output criteria and, in accordance with the output criteria, controls the switches in each of the battery circuits to output a voltage to at least two positive output terminals while substantially maximizing power delivered by the circuit arrangement, where the output criteria defines a number of positive output terminals at which to output a voltage and a voltage requirement for each output.

8. The reconfigurable battery system of claim 7 wherein the control unit determines a number of battery cells available for use from the battery cells in the plurality of the battery circuits and allocates the battery cells available for use to each output defined by the output criteria.

9. The reconfigurable battery system of claim 8 wherein the control unit receives the voltage output requirement for a given output and configures the switches in the plurality of battery circuits to form a circuit arrangement which outputs a voltage that meets the voltage output requirement for the given output.

10. The reconfigurable battery system of claim 9 wherein the control unit that determines a number of battery cells allocated to the given output, determines a number of battery cells arranged in series are needed to meet the voltage output requirement and determines a number of battery cell groups which can be arranged in parallel to each other from the number of battery cells allocated to the given output, where each battery cell group is comprised of a string of battery cells arranged in series that meet the voltage output requirement.

11. The reconfigurable battery system of claim 10 wherein the control unit configures the switches in the plurality of battery circuits to form a circuit arrangement which outputs a voltage that meets the voltage output requirement when the number of battery cell groups exceeds the number of battery cells arranged in series that meet the voltage output requirement.

12. The reconfigurable battery system of claim 9 wherein the control unit receives a number of parallel cell groupings for a given output and configures the switches in the plurality of battery circuits to form a circuit arrangement that minimizes the number of battery cells available for use that are bypassed in the circuit arrangement.

13. The reconfigurable battery system of claim 12 wherein the control unit determines a number of cells to comprise each parallel cell grouping by dividing the number of battery cells allocated to the given output by the number of parallel cell groupings, where the cells comprising a parallel cell grouping are arranged in series with each other.

14. The reconfigurable battery system of claim 13 wherein the control unit configures the switches in the plurality of battery circuits to form a circuit arrangement that minimizes the number of battery cells available for use when the number of cells to comprise each parallel cell grouping exceeds the number of parallel cell groupings.

15. The reconfigurable battery system of claim 7 wherein the plurality of switches are further defined as an input switch connected between the input terminal and the negative terminal of the battery cell; a parallel switch connected between the output terminal and the positive terminal of the battery cell; a bypass switch connected between the negative terminal of the battery cell and a negative terminal of an adjacent battery circuit; and a series switch connected between the positive terminal of the battery cell and the negative terminal of the adjacent battery circuit.

16. A reconfigurable battery system comprising:
a plurality of battery circuits interconnected to each other, each circuit having:
    a negative input terminal;
    a positive output terminal;
    a battery cell with a positive terminal and a negative terminal interposed between the input terminal and the output terminal;
    an input switch connected between the input terminal and the negative terminal of the battery cell;
    a parallel switch connected between the output terminal and the positive terminal of the battery cell;
    a bypass switch connected between the negative terminal of the battery cell and a negative terminal of an adjacent battery circuit; and
    a series switch connected between the positive terminal of the battery cell and the negative terminal of the adjacent battery circuit;
    an input-terminal switch interposed between the input terminal and an input terminal of the adjacent battery circuit;
    an output-terminal switch interposed between the output terminal and an output terminal of the adjacent battery circuit; and
a control unit that receives an output criteria and, in accordance with the output criteria, controls the input switch, the parallel switch, the bypass switch and the series switch in the plurality of battery circuits to output a voltage to at least two positive output terminals while substantially maximizing power delivered by the circuit arrangement, where the output criteria defines a number of positive output terminals at which to output a voltage and a voltage requirement for each output.

17. The reconfigurable battery system of claim 16 wherein the control unit determines a number of battery cells available for use from the battery cells in the plurality of the battery circuits.

18. The reconfigurable battery system of claim 16 wherein the control unit receives a voltage output requirement for the battery system and configures the input switch, the parallel switch, the bypass switch and the series switch in the plurality of battery circuits to form a circuit arrangement which outputs a voltage that meets the voltage output requirement.

* * * * *

UNITED STATES PATENT AND TRADEMARK OFFICE
CERTIFICATE OF CORRECTION

PATENT NO. : 8,427,106 B2  
APPLICATION NO. : 13/592967  
DATED : April 23, 2013  
INVENTOR(S) : Kim et al.

It is certified that error appears in the above-identified patent and that said Letters Patent is hereby corrected as shown below:

Title Page, Related U.S. Application Data, item [63]  
after "Pat. No. 8,330,419." insert the following:

--(60) Provisional application No. 61/168,472, filed on Apr. 10, 2009.--

Signed and Sealed this  
Seventeenth Day of December, 2013

Margaret A. Focarino  
*Commissioner for Patents of the United States Patent and Trademark Office*